US009355111B2

(12) United States Patent
He et al.

(10) Patent No.: US 9,355,111 B2
(45) Date of Patent: May 31, 2016

(54) HIERARCHICAL INDEX BASED COMPRESSION

(71) Applicant: Microsoft Corporation, Redmond, WA (US)

(72) Inventors: Liu He, Bejing (CN); Bo Cao, Bejing (CN); An Yan, Bejing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 216 days.

(21) Appl. No.: 14/265,806

(22) Filed: Apr. 30, 2014

(65) Prior Publication Data

US 2015/0317327 A1 Nov. 5, 2015

(51) Int. Cl.
*G06F 7/02* (2006.01)
*G06F 17/30* (2006.01)

(52) U.S. Cl.
CPC .... *G06F 17/30144* (2013.01); *G06F 17/30153* (2013.01); *G06F 17/30327* (2013.01); *G06F 17/30336* (2013.01); *G06F 17/30864* (2013.01); *G06F 17/30946* (2013.01)

(58) Field of Classification Search
CPC .............. G06F 17/30144; G06F 17/30327; G06F 17/30153; G06F 17/30864; G06F 17/30336; G06F 17/30946; G06F 17/30961
See application file for complete search history.

(56) References Cited

U.S. PATENT DOCUMENTS

| | | | |
|---|---|---|---|
| 7,778,979 B2 | 8/2010 | Hatonen et al. | |
| 7,917,494 B2 | 3/2011 | Muller | |
| 8,260,784 B2 | 9/2012 | Beyer et al. | |
| 2011/0246503 A1* | 10/2011 | Bender | G06F 17/30306 707/769 |
| 2012/0102298 A1* | 4/2012 | Sengupta | G06F 17/30312 711/216 |
| 2012/0109893 A1 | 5/2012 | Bryson | |
| 2013/0103982 A1 | 4/2013 | Chelliah et al. | |
| 2015/0261783 A1* | 9/2015 | Hu | G06F 17/30194 707/822 |

OTHER PUBLICATIONS

Budiu, et al., "Unified Query Processing for JSON Documents and Indexes", Published on: Dec. 2013 Available at:http://research.microsoft.com/pubs/205468/jpath.pdf., 16 pages.
Ottaviano, et al., "Semi-Indexing Semi-Structured Data in Tiny Space", In Proceedings of the 20th ACM International Conference on Information and Knowledge Management, Oct. 24, 2010, 10 pages.
Skibinski, et al., "Fast and Efficient Log File Compression", In Proceedings of 11th East-European Conference on Advances in Databases and Information Systems, Sep. 9, 2007, 14 pages.
Grabowski, et al., "Web Log Compression", Retrieved on: Jan. 6, 2014 Available at:http://sun.aei.polsl.pl/~sdeor/pub/gd07a.pdf, 9 pages.

* cited by examiner

*Primary Examiner* — Bruce Moser
(74) *Attorney, Agent, or Firm* — Dave Ream; Tom Wong; Micky Minhas

(57) ABSTRACT

Computer-readable media, systems, and methods for hierarchical index based compression are described. In embodiments, a hierarchical data log or key-value pair based data log, such as a JSON log, is received and a tree-structured index (index tree) is recursively constructed. In one embodiment, the log comprises search-engine user interaction information. Structural information of the log is preserved by the index tree structure; for example, each node of the log has a corresponding index-tree node. Frequently repeating keys, values, and correlated key-value pairs may be stored in the index-tree node, which may be indexed using multiple levels of detail including a raw-string level for raw string representations of the node, a first level for indexing keys and common values, and a second level for indexing correlated key-value pairs. The index tree may be used to compress rows of the data log and also used to decompress and restore the log.

20 Claims, 10 Drawing Sheets

```
☐ ⊘ IROOT                                    (JSONLIBTEST.INDEXISONCONTAINER)
  ☐ ⊘ [JSONLIBTEST.INDEXISONCONTAINER]       (JSONLIBTEST.INDEXISONCONTAINER)
    ⊞ ⊘ BASE                                 (JSONLIBTEST.INDEXISONCONTAINER)
    ⊞ ⊘ ARRAYELEMENTS                        COUNT = 0
    ☐ ⊘ JSONVALUES                           COUNT = 7
      ⊞ ⊘ [0]                                {(APPNS,JSONLIBTEST.INDEXSTRINGVALUE)}
      ⊞ ⊘ [1]                                {(IMPRESSIONGUID,JSONLIBTEST.INDEXSTRINGVALUE)}
      ⊞ ⊘ [2]                                {(IMPRESSIONGUID,JSONLIBTEST.INDEXSTRINGVALUE)}
      ☐ ⊘ [3]                                {(EVENTS,JSONLIBTEST.INDEXISONCONTAINER)}
          🔑 KEY                              "EVENTS"
        ☐ 🔑 VALUE                            (JSONLIBTEST.INDEXISONCONTAINER)
          ☐ ⊘ [JSONLIBTEST.INDEXISONCONTAINER]  (JSONLIBTEST.INDEXISONCONTAINER)
            ⊞ ⊘ BASE                         (JSONLIBTEST.INDEXISONCONTAINER)
            ⊞ ⊘ ARRAYELEMENTS                COUNT = 1000
            ☐ ⊘ JSONVALUES                   COUNT = 19
              ☐ ⊘ [0]                        {(T,JSONLIBTEST.INDEXSTRINGVALUE)}
                  🔑 KEY                      "T"
                ☐ 🔑 VALUE                    (JSONLIBTEST.INDEXSTRINGCONTAINER)
                  ⊞ ⊘ [JSONLIBTEST.INDEXSTRIN...  (JSONLIBTEST.INDEXSTRINGCONTAINER)
                    ⊘ NAME                   "T"
                  ⊞ ⊘ PARENT                 (JSONLIBTEST.INDEXISONCONTAINER)
                  ☐ ⊘ RAWVALUES              COUNT = 11
                    ⊞ ⊘ [0]                  {("EVENT.REDIRECT",13329)}
                    ⊞ ⊘ [1]                  {("EVENT.IMPRESSION", 86129)}
                    ⊞ ⊘ [2]                  {("EVENT.ANSWERSTLA",68579)}
                    ⊞ ⊘ [3]                  {("EVENT.PARTIALIMPRESSION.FRONTDOOR",139
                    ⊞ ⊘ [4]                  {("EVENT.DYNAMICCONTENT.MERGED",105)}
                    ⊞ ⊘ [5]                  {("EVENT.CPT",200)}
                    ⊞ ⊘ [6]                  {("EVENT.CLICK",28)}
                    ⊞ ⊘ [7]                  {("EVENT.MUIDCHANGED",4)}
                    ⊞ ⊘ [8]                  {("EVENT.CLINETINST",7)}
                    ⊞ ⊘ [9]                  {("EVENT.DYNAMICCONTENT", 11)}
                    ⊞ ⊘ [10]                 {("EVENT.PARTIALDYNAMICCONTENT",1)}
                  ⊞ ⊘ RAW VIEW
                  🔧 STATIC MEMBERS
                ⊞ ⊘ NON-PUBLIC MEMBERS
      ⊞ ⊘ [1]                                {(EVENTID, JSONLIBTEST.INDEXSTRINVALUE)}
      ⊞ ⊘ [2]                                {(REQUESTINFO, JSONLIBTEST.INDEXISONCONTAINER)}
      ⊞ ⊘ [3]                                {(RESPONSEINFO, JSONLIBTEST.INDEXISONCONTAINER)}
      ⊞ ⊘ [4]                                {(SERVERCONTEX, JSONLIBTEST.INDEXISONCONTAINER)}
      ⊞ ⊘ [5]                                {(USERINFO, JSONLIBTEST.INDEXISONCONTAINER)}
```

*FIG. 3.*

String representation of a row in JSON log:

{AppNS:"FD",Enrich:{AppNS:interactiveLevel:"2",ComScoreVerticalVisitDistinctQuery:"1",DSQIdInSequenceVertical:"5",IsNormalQueryVisit:"1",ClickTracked:"15",UserPartition:"4",MergeAppVersion:"4.0.7_7_24_6171B",VisitUniqueUserVector:"0",VisitVertical:"web",FollowOnForm:"MSNH74",FollowOnSeq:"0",VisitSeq:"11",VisitDur:"1246603",VisitDistinctQuery:"1",VisitHitCount:"41",VisitPartnerCode:"HPNTDF",VisitNum:"0",BotInfo:{AppNS:Form:"0",Ip:"0",Query:"0",UserAgent:"0",UserAgentContains:"0",User:{FormCount:"0",QueryCount:"0",IpCount:"0",UserAgentContainsCount:"0",ModelLegacy:{Label:"User",Confidence:"1",Version:"1.0"},Model:{Label:"User",Confidence:"1",Version:"1.0"},ModelCandidate:{Label:"User",Confidence:"1",Version:"1.0"}},FollowOnPartner:"HPNTDF",FollowOnNum:"2",UserForm:"null",UserHasCookies:"True",UserHasClientId:"True",BotVNext:"False",AllHitCount:"71",HiSeq:"11",AllHitSeq:"11",DistinctQuery:"1",SuccessVisitUniqueUserVector:"0",IsNormalQuery:"True",HitCount:"71",UniqueUserVector:"0",UserUniqueQueries:"42",UserUniqueIPs:"1",Partition:"s_sample",VerticalVisitDistinctQuery:"1",UserVertical:"system",UserHasSrcUuid:"True",UserQueryUserErrorCount:"1",VisitForm:"MSNH74",UserClickCount:"14",ClientId:"01942BCEAB969DD1CA236A7EEB9693F",ImpressionGuid:"AAAD51EC06DC4B99B12313B361FC9723",Events:[{AppNS:"FD",T:"Event.Impression",EventId:"77C76AB0FF714D6A87A0EE5B69F75358",RequestInfo:{...

810 ~ {[City:Philadelphia, Market:en-US, Continent:North America,] ClientId: 4A70A8E585A }
                 802                                                804        805
                                                                          806

820 ~ RawStringIndex: empty

830 ~ JsonKeyIndex: <Key, index>
                         832  834

835 ~ <City, 0> , <Market, 1> , <Continent, 2> , <ClientId, 3> ...

840 ~ Level2Index: <"key-value pairs" , index>

842 ~ <"City:Memphis, Market:en-US, Continent:North America" , 0>
844 ~ <"City:Philadelphia, Market:en-US, Continent:North America" , 1>,
846 ~ <"City:Oxford, Market:en-GB, Continent:Western Europe" , 2>

...

Resulting indexed row:
                      805
850 ~ { [1 , 3] 4A70A8E585A }
        852 853    855

*FIG. 8.*

910 ⌐ {ReverseIpInfo:{CityPhiladelphia, Market:en-US, Continent:North America}, ClientId:4A70A8E585A}
          902          904                                                        906              908

Resulting indexed row:
             928
922   926 ⌐    ⌐
  {0:0:1:4A70A8E585A}
920 924

This time JSON object ({City:Philadelphia, Market:en-US, Continent:North America}) will be included in raw string index.

*FIG. 9.*

HIERARCHICAL INDEX BASED COMPRESSION

BACKGROUND

User search-engine behavior, such as queries or user requests, query results and search-engine results pages, and search-engine user interaction information, can be collected, stored, and used for improving search-engine user experience and product quality. One format used for logging the user interaction information is the JavaScript Object Notation (JSON) format. For example, a Search Activity Log of user interaction information contains one row per page view to store the user interaction information, which may include user requests, the search-engine response, and user interaction in or associated with the search engine website or application.

The size of the logs used to store the user interaction information can reach dozens of petabytes, and the growth rate may continue to increase over time. As a result, the logs can be compressed to reduce storage usage. Previous solutions for log compression, such as more general compression schemes like Microsoft Xpress Compression Algorithm [MS-XCA], are not tailored for hierarchical index log compression and preserve neither structural information nor global indexes of the log.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention relate to computer-readable media, systems, and methods for hierarchical index based compression. In an embodiment, a hierarchical data log or key-value pair based data log, such as a log in JSON format, is received and an index tree is recursively constructed from the log. The log may include any type of data, but in an embodiment, the data is associated with user search-engine behavior, such as user requests, the search-engine response, and user interaction in or associated with the search engine website or application. The index tree is then used to compress the rows of the data log. The index tree can also be used to decompress and restore the compressed log. Data logs compressed using embodiments of the invention may be further compressed by conventional compression schemes.

BRIEF DESCRIPTION OF THE SEVERAL VIEWS OF THE DRAWINGS

The present invention is described in detail below with reference to the attached drawing figures, wherein:

FIG. 3 illustratively depicts a portion of an example JSON index tree generated from a data log, in accordance with an embodiment of the present invention;

FIG. 4 illustratively depicts a raw string representation of one row in a JSON log, in accordance with an embodiment of the present invention;

FIGS. 8 and 9 illustratively depict examples of applying the methods described in connection to FIGS. 6 and 7, in accordance with an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 10:
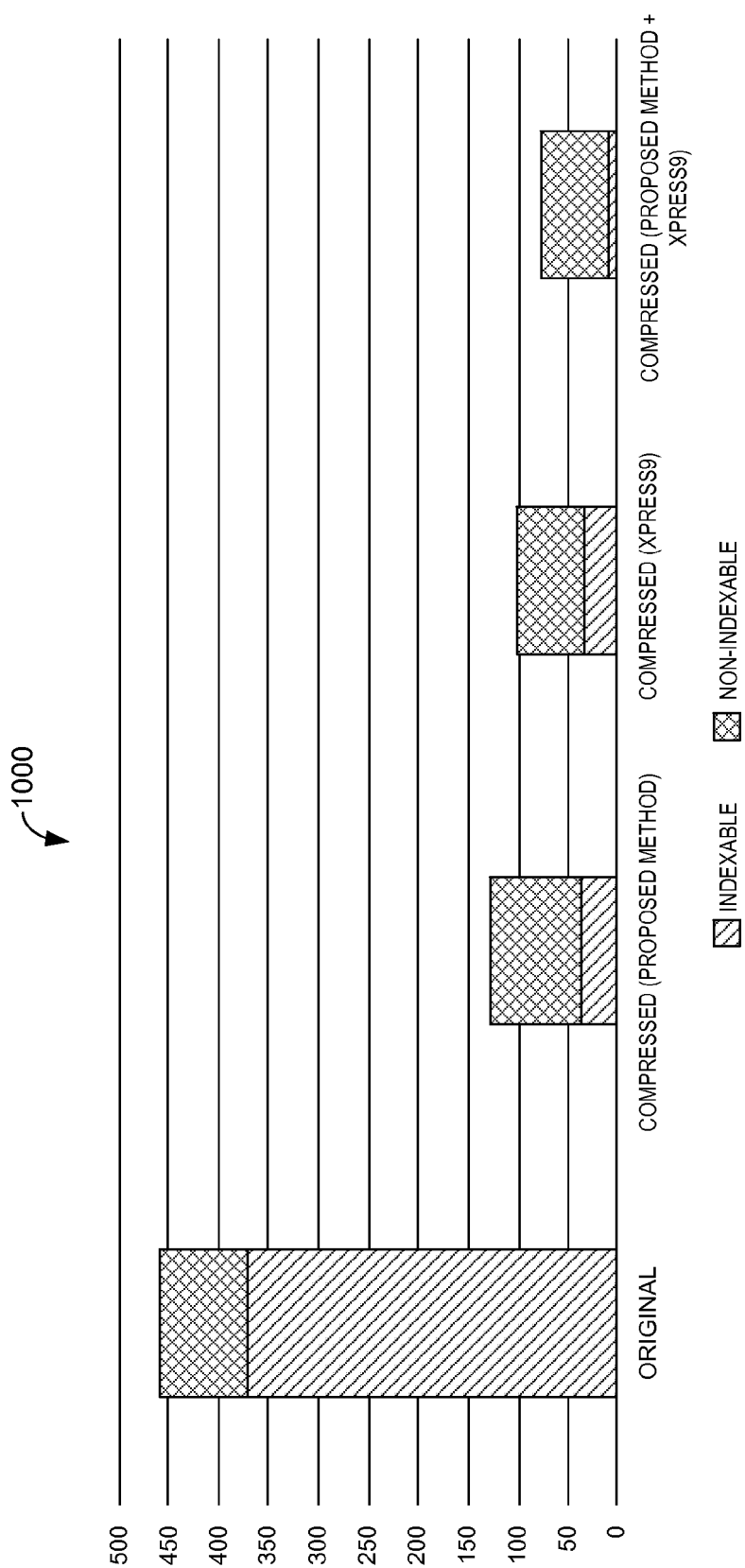
FIG. 10 shows a comparison of representative storage usage resulting from applying embodiments of the invention vs. a conventional compression scheme.

Various aspects of the technology described herein are generally directed to systems, methods, and computer storage media for, among other things, hierarchical index based compression. The present invention is directed to a storage-efficient way to store a data log. In an embodiment, a hierarchical data log or key-value pair based data log, such as a log in JSON format, is received and an index tree is recursively constructed from the log. The log may include any type of data, but in an embodiment, the data is associated with user search-engine behavior, such as user requests, the search-engine response, and user interaction in or associated with the search engine website or application. The index tree is then used to compress the rows of the data log. The index tree can also be used to decompress and restore the compressed log. Data logs compressed using embodiments of the invention may be further compressed by conventional compression schemes. For example, an embodiment of the invention has been shown to reduce some data logs by twenty-three percent on top of existing compression, which corresponds to a reduction of 2 petabytes of storage, saving 1.7 million USD per year. FIG. 10 provides chart 1000 showing a comparison of representative storage usage resulting from embodiments of the present invention vs. a conventional compression scheme (Xpress). Chart 1000 also shows that further compression is possible when combining conventional compression technologies and embodiments of the invention.

Further, embodiments of the invention have several advantages over simple look-up table including that a separate index may be kept for each hierarchical path or a JSON path, thus the size of each index is reduced; a smaller index size may result in a smaller indexed log and faster look-up performance; and the tree structure provided by some embodiments of the invention for storing data logs, which is capable of preserving structural information in the data log, such as a global index, provides better reliability and less maintenance costs.

While embodiments discussed herein refer to a data log of user search-engine interaction information or a JSON log, it will be understood by one of ordinary skill in the art that embodiments are not limited to this user interaction data or data stored in a JSON format. For example, other embodiments may use any log format that includes similar key-value pairs and/or is organized in a hierarchy. Thus, some embodiments may be used to significantly reduce storage costs for companies or entities which have big data.

Accordingly, in one embodiment, the present invention is directed to one or more computer-storage media having computer-executable instruction embodied thereon that, when executed by one or more computing devices, perform a method of building an index tree for compressing a logfile. The method comprises receiving a logfile comprising one or more nodes, each node having a one or more keys, values, or key-value pairs. The method further includes for a first node, determining whether to index a raw string representation of the node. Upon determine to index the raw string, storing the raw string representation of the node in a raw-string level index. Upon determining to not index the raw string: (1) storing the keys of the node in a first level index; (2) for each key-value pair in the node, determining that the key-value pair is correlated; and (3) upon determining that the key-value pair is correlated, storing the key-value pair in a second level index. The method further includes creating an index tree corresponding to the logfile, from the raw string, first, and second level indexes of the first node.

In another aspect, an embodiment of the presented invention is directed to one or more computer-storage media having computer-executable instruction embodied thereon that, when executed by one or more computing devices, perform a method of compressing a logfile. The method comprises receiving a logfile including one or more logfile nodes, each logfile node having one or more keys, values, or key-value pairs; and receiving an index tree corresponding to the logfile, the index tree including one or more index tree-nodes corresponding to the one or more logfile nodes, and further comprising a raw-string level index, a first level index, and a second level index corresponding to each index tree-node. The method further includes: for a first logfile node corresponding to a first index tree-node, determining whether the first logfile node is indexed as a raw string. Upon determining that the first logfile node is indexed as a raw string, replacing the logfile node with a raw-string index entry, in the raw string level index, that corresponds to a raw string representation of the logfile node. Upon determining that the first logfile node is not indexed as the raw string: (1) for each key-value pair of the first logfile node, determining whether the key-value pair is indexed in the second level index; (2) upon determining that the key-value pair is indexed in the second level index, replacing the key-value pair with a second-level index entry, in the second level index, that corresponds to the key-value pair; and (3) upon determining that the key-value pair is not indexed in the second level index, replacing the key of the key-value pair with a first-level key index entry, in the first level index, that corresponds to the key.

In yet another aspect, an embodiment of the presented invention is directed to one or more computer-storage media having computer-executable instruction embodied thereon that, when executed by one or more computing devices, perform a method of compressing a logfile using a tree-structured index corresponding to the logfile. The method comprises receiving a logfile comprising one or more nodes, each node having a one or more keys, values, or key-value pairs. The method further includes for each node, recursively: (1) determining whether to index a raw string representation of the node; (2) upon determine to index the raw string, storing the raw string representation of the node in a raw-string level dictionary; and (3) upon determining to not index the raw string: a) storing the keys of the node in a first-level key dictionary; b) determining common values of the node by identifying one or more values of the node that repeat in the logfile; c) storing the common values in the first-level value dictionary; and d) for each key-value pair in the node, determining that the key-value pair is correlated; and e) upon determining that the key-value pair is correlated, storing the key-value pair in a second-level dictionary. The method further includes creating an index tree corresponding to the logfile, from the raw string, first-level value, first-level key, and second-level dictionaries of each node. The method further includes for each node of the logfile, compressing the node with the index tree.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 1:
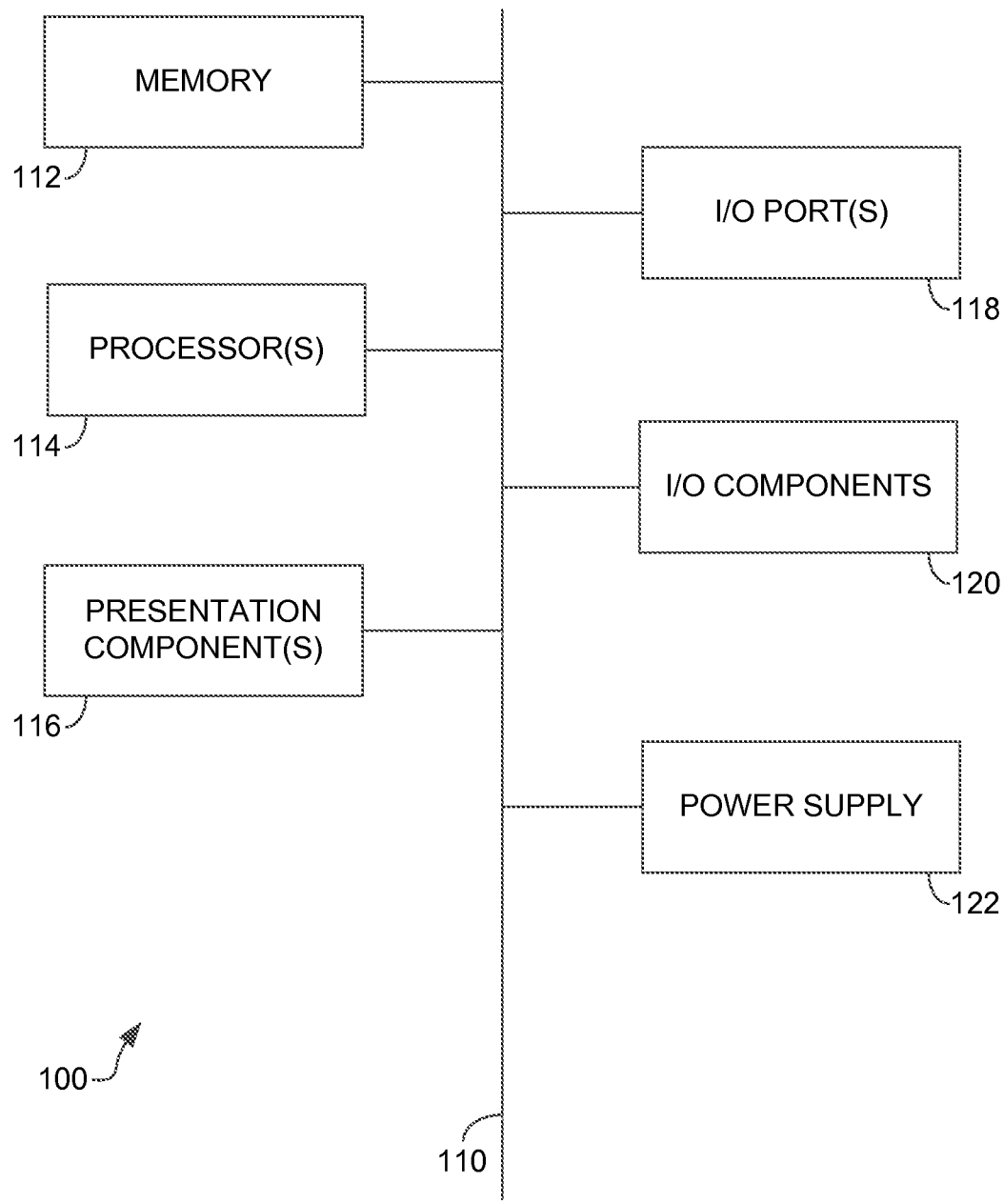
FIG. 1 is a block diagram of an exemplary computing system environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

The computing device 100 typically includes a variety of computer-readable media. Computer-readable media may be any available media that is accessible by the computing device 100 and includes both volatile and nonvolatile media and removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

The memory 112 includes computer storage media in the form of volatile and/or nonvolatile memory. The memory may be removable, non-removable, or a combination thereof. Exemplary hardware devices include solid-state memory, hard drives, optical-disk drives, and the like. The computing device 100 includes one or more processors that read data from various entities such as the memory 112 or the I/O components 120. The presentation component(s) 116 presents data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone; joystick; game pad; satellite dish; scanner; printer; wireless device; a controller, such as a stylus, a keyboard, and a mouse; a natural user interface (NUI); and the like. An NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100.

The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote-processing devices that are linked through a communications network. In a distributed computing environment, program modules may be located in both local and remote computer storage media, including memory storage devices.

Furthermore, although the term "server" is often used herein, it will be recognized that this term may also encompass a search engine, a back-end data processing system, an advertiser service, a Web browser, a cloud server, a set of one or more processes distributed on one or more computers, one or more stand-alone storage devices, a set of one or more other computing or storage devices, a combination of one or more of the above, and the like.

Figure 2:
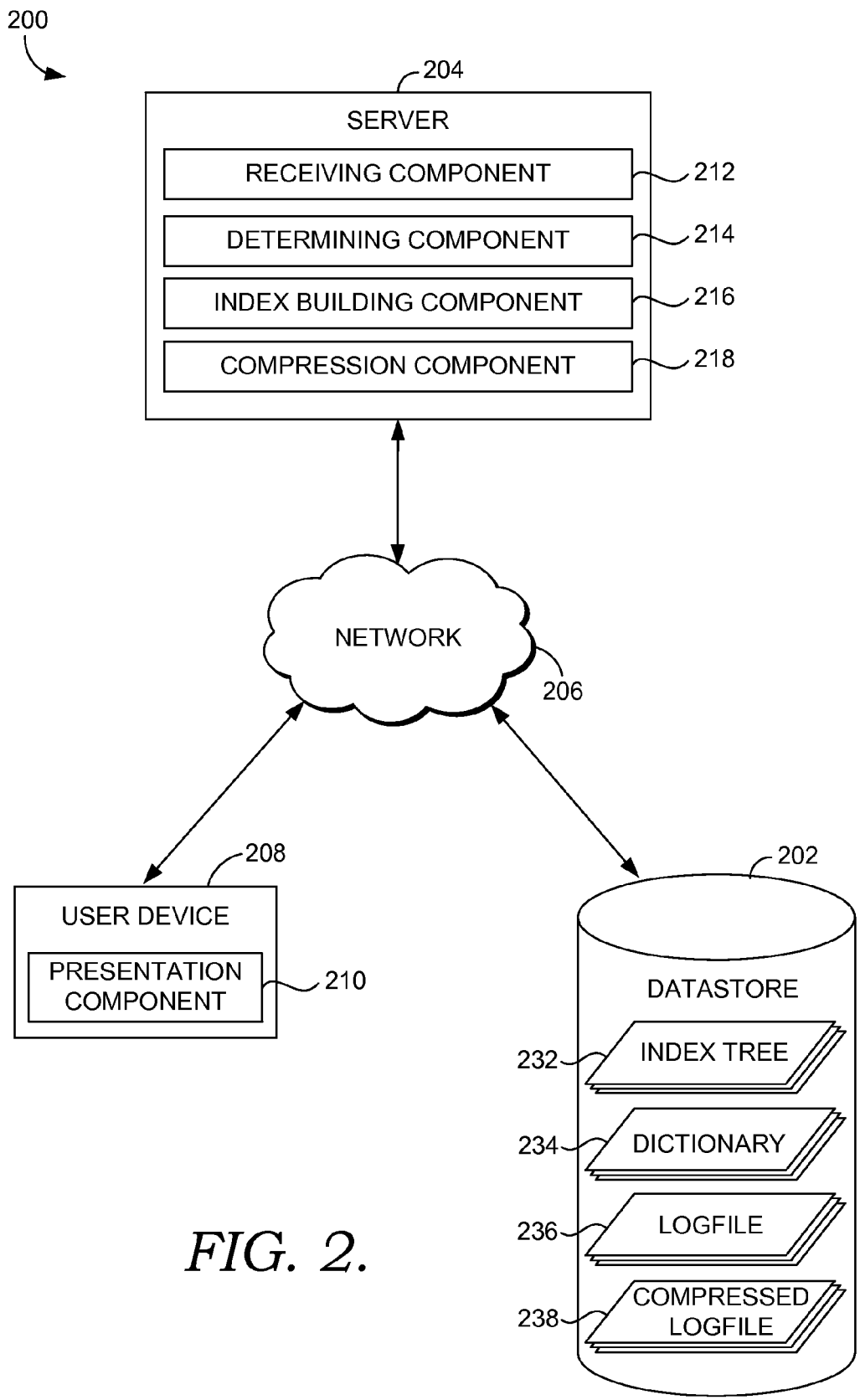
FIG. 2 is a block diagram illustrating an exemplary system for hierarchical index compression, in accordance with an embodiment of the present invention.

Referring now to FIG. 2, a block diagram is provided illustrating an example computing system 200 in which embodiments of the present invention may be employed. Generally, the computing system 200 illustrates an environment where hierarchical index based compression may be carried out, in accordance with an embodiment of the present invention. The system 200 includes a datastore 202, a server 204, and a user device 208 in communication with one another via a network 206. Network 206 may include, without limitation, one or more local area networks (LANs) and/or wide area networks (WANs). Such networking environments are commonplace in offices, enterprise-wide computer networks, intranets, and the Internet. Accordingly, network 206 is not further described herein.

User device 208 may be any type of computing device, such as computing device 100 described with reference to FIG. 1, for example, and may include presentation component 210. The presentation component 210 is configured to present (e.g., display) content in accordance with one or more received user search queries or search-engine interactions. User device 208 is representative of devices that may be used to facilitate generating search-engine user interaction information contained within data logs that can be compressed using embodiments of the invention. Therefore, it will be appreciated that some embodiments operate in an environment without user device 208.

The server 204 may be any type of computing device, such as computing device 100 described with reference to FIG. 1, and includes a receiving component 212, a determining component 214, an index building component 216, and a compression component 218. Further, the server 204 is configured to operate utilizing at least a portion of the information stored in the datastore 202.

The receiving component 212 is configured to receive user interaction information from one or more user devices 208, servers 204, or datastore 202. User interaction information may be received in the form of a data log, such as logfile 236 stored in datastore 202, or may be received from user device 208 and/or a server 204. By way of example and not limitation, user interaction information can include user-submitted queries, search results, ads displayed, user clicks on links or ads, information about the user device 208 including mobile device information if the user device is a mobile device, search application information (e.g., browser or app information, if search engine is embedded within an app), user location, IP address, user ID, client ID information, or any combination of information related to a user interaction with the search engine. In various embodiments, the receiving component 212 may store such information in datastore 202 as a logfile 236, and in various embodiments, such information is stored hierarchically, such as using a JSON format. In an embodiment, receiving component 212 is configured to receive from datastore 202 a logfile 236 that is organized in hierarchy or has key-value pairs, such as a JSON log.

The determining component 214 is configured to determine conditions for facilitating building an index and/or compressing a logfile using an index, in accordance with index building component 216 and compression component 218. For example, as more fully described in connection to FIGS. 6 and 7, in some embodiments, determining component 214 is configured to determine if a JSON node can be stored as a raw string representation in an index item or entry, or to determine whether key-value pairs of a logfile 236 can be correlated.

The index building component 216 is configured to construct an index tree 232 from a logfile 236. At a high level, an embodiment of index building component 216 can be understood as constructing index tree 232 using two "passes" of a logfile 236. In a first pass, a raw string index and level 1 index are constructed for nodes of the logfile; then in a second pass, key-value pairs are checked for correlation, and if key-value pairs are correlated, then a level 2 index is built based on the level 1 index for those correlated pairs in that node. This may be repeated for the nodes and all of the rows of the logfile 236. The resulting three layers of the index tree 232 (raw string, level 1, and level 2) can cover the whole logfile 236 and may be used to compress logfile 236 as described below. In an embodiment, index building component 216 recursively constructs a global index tree from a logfile 236, as described in connection to FIG. 6. An example portion of an index tree 232 constructed by index building component 216, in accordance with an embodiment of the present invention, is illustratively provided in FIG. 3.

In embodiments where logfile 236 is a JSON log, the index tree 232 is constructed so that each JSON node in a logfile 236 corresponds to an index tree entry or index entry. In these embodiments, every JSON tree of the logfile can "fit" by design into the index tree constructed by index building component 216. In other words, an index tree 232 is constructed so that a JSON tree node in logfile 236 has a corresponding index tree node in index tree 232, and vice versa. Therefore, in such embodiments, every JSON path in logfile 236 has a separate index entry (or index tree node) in index tree 232.

The compression component 218 is configured to compress a logfile 236 or a row of a logfile 236 using the index tree 232. In an embodiment, compression component 218 compresses logfile 236 recursively, one row at a time (or by rows), using an index tree 232 that was constructed based on the logfile 236, such as described in connection to FIG. 7. An example indexed row resulting from compression of a row of a logfile 236 using an index tree 232 by compression component 218, in accordance with an embodiment of the present invention, is shown as item 850 in FIG. 8.

At a high level, one embodiment of compression component 218 compresses a row of logfile 236 by replacing JSON tree nodes with a raw string index where the JSON tree node can be represented as a raw string index. In an embodiment, a JSON tree node can be represented as a raw string index where the size of the raw string index will be limited, such as where the number of key values are limited. In one embodiment, a threshold is used to determine whether the item is worth indexing; in particular, whether representing JSON tree node using the raw string index will result in a raw string that is limited in size (i.e., is not larger than a given size determined by the threshold). The threshold value may be based on storage limitations or efficiency considerations, may be pre-determined, set or varied by an administrator, or hard coded. In one embodiment, the threshold comprises an efficiency factor, which is represents a ratio of storage based on whether the item is indexed or not; for example, the storage that is saved by including the item in the index vs. storage taken up by the growing index (or dictionary). A smaller index size results in faster look-up performance and smaller indexed log.

For a JSON tree node that cannot be indexed using the raw string index, the node is checked to determine whether it is suitable for a level 2 index, such as by checking for correlation. The level 2 index is used to replace multiple key-value pairs with a single index entry. For key-value pairs that cannot be included in a level 2 index, the keys are replaced by index entries of a level 1 index. Additional details regarding embodiments of methods using compression component 218 are described in connection to FIG. 7.

Datastore 202 is configured to store one or more index trees 232, dictionaries 234, logfiles 236, and compressed logfiles 238. In various embodiments, datastore 202 is also configured to be searchable for content and/or may provide content requested by server 204. Further, although depicted as a single datastore in FIG. 2, various embodiments of datastore 202 may comprise one or a plurality of separate memory components, such as memory 112 of FIG. 1, or may be distributed in the cloud.

Logfile 236 comprises one or more hierarchically organized or key-value pair based data logs, such as a JSON log. Logfile 236 may contain any type of data, but in an embodiment, the data is associated with user search-engine behavior, such as user requests, the search-engine response, and user interaction in or associated with the search engine website or application. In various embodiments, the data in a logfile 236 corresponds to user interaction information from many users over a time period, such as one day.

In various embodiments, a logfile 236 may be organized as a tree structure or hierarchical structure of data having rows of similar (but not identical) structure. In some embodiments, each row corresponds to a record. FIG. 4 illustratively depicts a portion of an example row of a logfile 236. With reference to FIG. 4, example row 400 is a string representation of a portion of one row of a JSON log and includes data organized in key-value pairs such as example key-value pair 405 representing "ImpressionGuid" (key) and "AAAD51EC06DC4B99B12313B361FC9723" (value).

Figure 5:
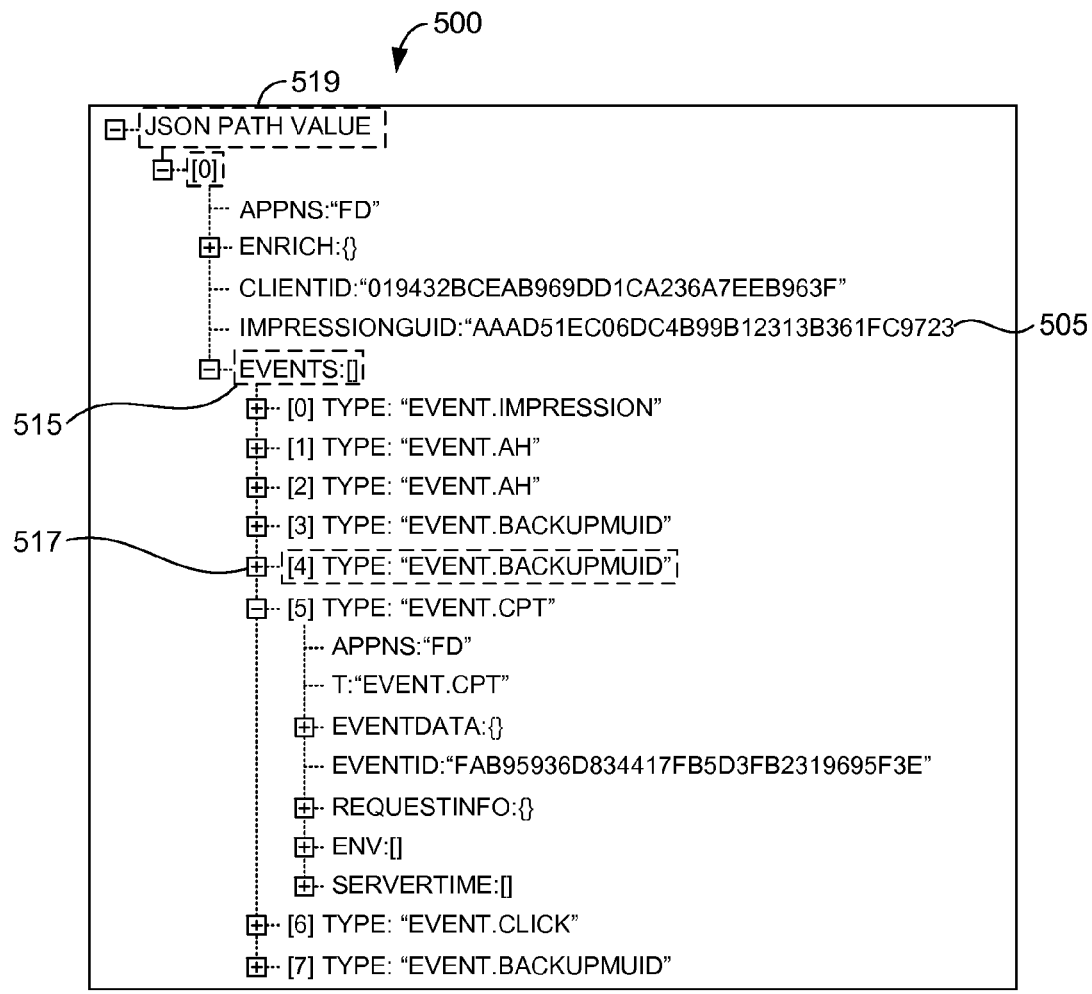
FIG. 5 illustratively depicts a JSON index tree corresponding to the raw JSON string depicted in FIG. 4, in accordance with an embodiment of the present invention.

FIG. 5 illustratively depicts a portion of an example JSON tree 500 corresponding to example row 400. With reference to FIG. 5, example JSON tree 500 includes JSON tree nodes, such as nodes 515 and 517. Each tree node includes one or more key-value pairs, such as example key-value pair 505, which corresponds to example key-value pair 405 in FIG. 4. In some embodiments, a JSON tree node, such as node 515 (e.g., "EVENTS: [ ]"), may be a parent node with one or more child nodes, such as node 517 (e.g., "[4] TYPE: "EVENT- .BACKUPMUID""), which may have their own child node(s) (not shown). Further, a value for a key-value pair of a parent node may include a child node with one or more key-value pairs. By way of example only, node 517, which includes a key-value pair (TYPE: "EVENT.BACKUPMUID"), represents part of the value for the key-value pair in node 515. By way of a second example and not limitation, the portion of JSON tree 500 shown in FIG. 5 represents a value of a key-value pair included in node 519. In such embodiments, each node may be identified by a JSON path, which includes the key-value pairs of the node and its parent(s).

Returning to FIG. 2, dictionary 234 comprises a set of dictionary entries (or expressions) for an index tree, such that the dictionary entries represent keys, values, or strings, which may include one or more key-value pairs occurring in sequence, of a logfile 236. It is often the case that a row or node will include repeating keys, values, and/or strings; therefore, during the compression, these repeating items may be replaced by a shorter expression. By way of example and not limitation, with reference to FIG. 8, a dictionary 835 is shown as "<City, 0>, <Market, 1>, <Continent, 2>, <ClientID, 3>, . . . ". Example dictionary 835 includes a set of dictionary entries or expressions ("0," "1," "2," "3," . . . ) that will represent the keys ("City," "Market," "Continent," "ClientID," etc., respectively) of node 810, when it is compressed.

In particular, the dictionaries 234 are created by index building component 216 during construction of an index tree 232. The dictionary entries or expressions will replace the keys, values, or strings that the entries represent in the resulting index tree. Thus, for example, the "Market" key in node 810 will be replaced with the expression "1" when node 810 is compressed by compression component 218. In some embodiments, each JSON path has a corresponding dictionary. Further, in some embodiments, methods may be used to shorten an index tree based on the JSON log structure of the logfile 236. In particular, keys or items that repeat more frequently (such as a frequently occurring key-value pair) may be replaced with a shorter expression, such as a unigram (e.g., "1"), while items appearing less frequently may be assigned longer expressions, such as longer n-grams (e.g., "10," "300," "AF," or the like.) Additional details regarding dictionary 234 are provided in connection to FIGS. 6 and 7.

In contrast to some compression technologies that use compression dictionaries of a limited scope, some embodiments of the present invention use one or more dictionaries 234 with a scope reflecting the entire log or log row. Specifically, dictionaries used by conventional compression systems are applied typically to windows (portions) of the data, often because there is no knowledge of the data or data structure. The data is thus broken into pieces and a separate dictionary is used for each piece. Thus, a term that repeats in different pieces is repeated in each dictionary. In contrast, some embodiments of dictionary 234 are capable of having a scope reflecting the entire log or log row because knowledge of the log structure is known. Repeating terms (e.g., keys, values, strings) that occur anywhere in the log can therefore be represented by a dictionary 234.

Index tree 232 comprises a tree-structured index that preserves the hierarchical structure or key-value pairs of a logfile 236. As described above, index tree 232 includes the three layers or levels, raw, level 1, and level 2, and may be constructed recursively from a logfile 236 by index building component 216, based on the structure of logfile 236. For example, index tree 232 may be constructed so that each tree node in a logfile 236 corresponds to an index tree node (or index tree entry). Thus, as described above, in these embodiments every JSON path in logfile 236 has a separate index entry in index tree 232.

The multiple levels of an index tree 232 may be used to index a JSON tree node (or a similar tree node) of a logfile 236. For the raw level, where the raw string index of a JSON tree node is small enough, it is used to represent the corresponding JSON tree node for the index tree. The next level of the index tree 232 is level 1. In an embodiment, level 1 includes JSON keys and some corresponding JSON values that are worth indexing. Values worth indexing may include values that repeat more frequently. Level 2, which represents the third level of index tree 232, includes index entries for correlated key-value pairs. From the level 1 index, if key-value pairs are correlated in a node, then a level 2 index is built based on the level 1 index for those correlated pairs in that node. In some embodiments, one or more of the three index tree levels may be empty, based on the content and structure of logfile 236. An example portion of an index tree 232 constructed by index building component 216, in accordance with an embodiment of the present invention, is illustratively provided in FIG. 3. In some embodiments, dictionary 234 may be considered part of index tree 232. Additional details regarding constructing an index tree 232 are described in connection to FIG. 6.

Compressed logfile 238 comprises a logfile 236 or portion of a logfile, such as a row, that has been compressed using a corresponding index tree 232 by compression component 218. An example of a compressed logfile row, compressed using an index tree 232, is shown as item 850 in FIG. 8. The index tree 232 used to create compressed logfile 238 can also be used to decompress and restore the log from compressed logfile 238.

It will be understood and appreciated by those of ordinary skill in the art that additional components not shown may also be included within any of system 200, datastore 202, server 204, and user device 208. For example, one embodiment of server 204 includes an extraction component (not shown) configured for extracting and restoring a logfile 236 (or portion of a logfile 236), from compressed logfile 238, which may have been compressed by compression component 218 using an index tree 232 corresponding to the logfile 236. In another embodiment, extraction operations may be performed by compression component 218 and/or receiving component 212. Any and all such variations, and any combinations thereof, are contemplated to be within the scope of embodiments of the present invention. The content and/or volume of such information are not intended to limit the scope of embodiments of the present invention in any way. Further, though illustrated as a single, independent component, datastore 202 may, in fact, be a plurality of databases, for instance, a database cluster, portions of which may reside on a computing device associated with the server 204, on the user device 208, on another external computing device (not shown), or any combination thereof.

Figure 6:
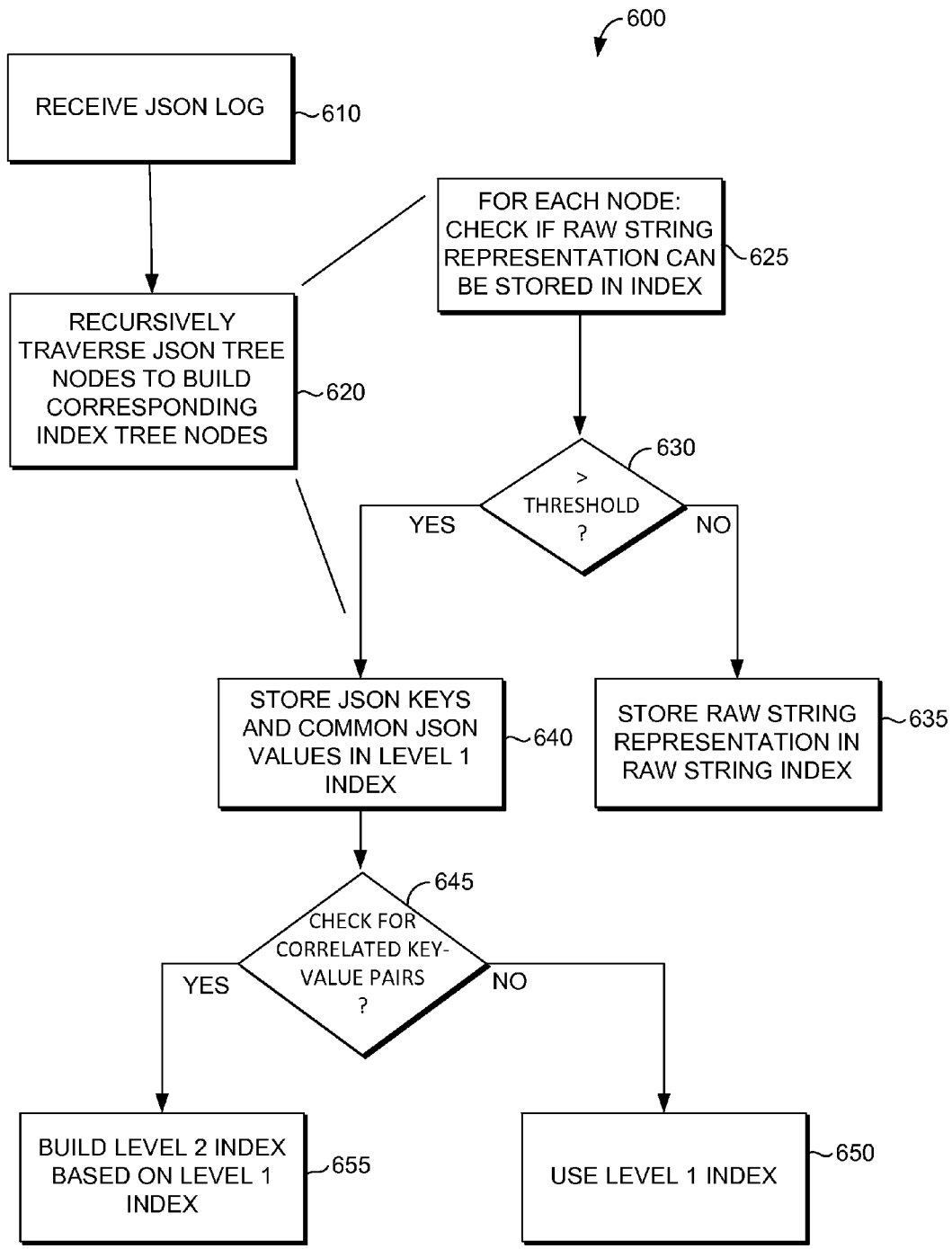
FIG. 6 is a flow diagram illustrating an exemplary method for building an index tree, in accordance with an embodiment of the present invention.

Turning now to FIG. 6, a flow diagram of an example embodiment of a method for building an index tree is illustrated and designated generally as reference numeral 600. Example method 600 comprises building an index tree 232 from a logfile 236, such as a JSON log. Although a JSON log is used for method 600, it is contemplated that other hierarchically organized or key-value pair data logs may be used, as described previously. In one embodiment, index building component 216, described in connection to FIG. 2, may facilitate carrying out method 600.

Initially, as indicated at step 610, a JSON log or logfile 236 is received, e.g., by receiving component 212 of FIG. 2. At a step 620, JSON tree nodes of the JSON log are traversed recursively to build index tree nodes, as described below in steps 625 through 655 of method 600. In this example embodiment, method 600 recursively traverses each JSON tree node in a row of the received logfile. (An example row of a logfile is illustratively provided in FIG. 4.)

For each node in the row, the three levels of the index tree (raw string, level 1, and level 2) are determined. At a high level, method 600 can be understood as constructing an index tree 232 by performing two "passes" on the received logfile 236. In a first pass (steps 625 through 640 of method 600), a raw string index and level 1 index are constructed for nodes of the logfile. Then in a second pass (steps 645 through 655), key-value pairs are checked for correlation, and if the key-value pairs are correlated, then a level 2 index is built based on the level 1 index for those correlated pairs in that node. Upon determining these levels for each node and all the rows of the JSON log, a full index tree is created for the data in the JSON log.

Accordingly, for each JSON tree node, the following steps are used to build a corresponding index tree node (or index tree entry). At step 625, check if the raw string representation of the node can be stored in the index. In an embodiment, the raw string representation of the JSON node is stored in the raw string index, until or unless the raw string index becomes too large, as may be determined by a threshold. In particular, in an embodiment, we first check to see if we can store the whole value or raw string representation of the JSON node as a raw string index entry. Whether the raw string representation of the JSON node can be stored in the index entry may depend on whether the node is repeating or highly correlated. In an embodiment, we count how many times the raw string will go into the dictionary. If the dictionary will become too big, then we stop indexing it and go onto the next level, such as level 1. In an embodiment, a threshold is used to determine whether to use the raw string representation stored in the raw string index or to go onto level 1. Accordingly, at step 630, the threshold is applied. If the raw string index size would be less than or equal to the threshold, then at step 635, we store the raw string representation in the raw string index. If however, the raw string index size would be greater than the threshold, then we proceed to level 1 indexing at step 640. In one embodiment, the threshold comprises an efficiency factor, which is represents a ratio of the resulting storage based on whether an item, such as the raw string representation, is indexed or not; for example, the storage that would be saved in the compressed log by including the raw string in the index vs. the resulting storage needed for the raw string index (or dictionary).

At step 640, JSON keys and common JSON values are stored in the level 1 index. Common JSON values may include values from key-value pairs that repeat in a node or other nodes. In an embodiment, the values are checked to see whether they are repeating. For example, the value "en-US" (corresponding to the key "Market") may repeat many times for a node and, therefore, would be included in the level 1 index. If the values repeat, then they are saved to the index. If the values don't repeat, then they may be excluded from indexing. For example, the value "4A70A8E585A" corresponding to the key ClientID may not repeat or not repeat often because each user has a separate ClientID value. Therefore, the ClientID value would not be indexed.

At step 645, we check for correlated key-value pairs in the first level of the index. In particular, in an embodiment, we check the number of values corresponding to each key. Where we identify a key with a limited number or values (e.g., the value "North America" for the key-value pair "Continent: North America," because there are only a limited number of continents), the key-value pair is more likely to be correlated. For example, here it is likely that there will more frequently be occurrences of the key-value pair "Continent:North America." Because there are a limited number of combinations, we can determine how many combinations exist in the log. In one embodiment, the entire log is examined for correlated key-value pairs. In one embodiment, if the number of combinations is below a threshold, then at step 655 the correlated key-value pair is indexed in the level 2 index. In one embodiment, the threshold comprises an efficiency factor, which represents a ration of storage based on whether the item is included in the index. For example, one embodiment calculates an efficiency factor for an element in the JSON object by first removing the element from the level 2 index of the JSON object. Then determining the size change of the index file is and size change of the encoded stream of the log, which can be determined using the index. In one embodiment, where a key-value pair is not correlated, we proceed to step 650 and use the level 1 index for that correlated key-value pair. For a correlated key-value pair, method 600 proceeds to step 655, where a level 2 index is built based on the level 1 index. An example of building an index tree using method 600 is provided in connection to FIG. 8.

Figure 7:
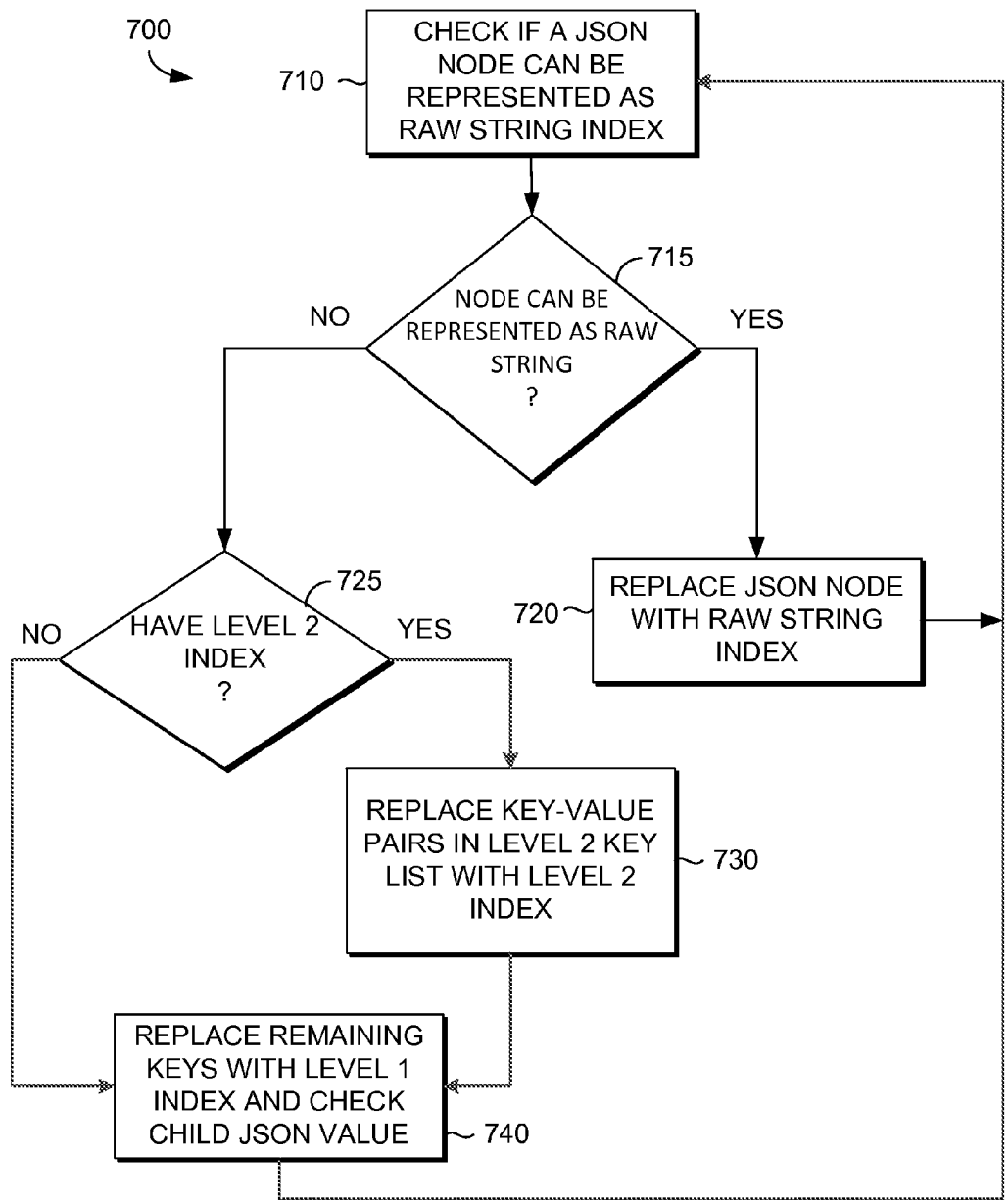
FIG. 7 is a flow diagram illustrating an exemplary method for compressing one row of a data log using an index tree, in accordance with an embodiment of the present invention.

With reference now to FIG. 7, a flow diagram of an example embodiment of a method for compressing one row of a data log using an index tree (sometimes referred to herein as "row encoding") is illustrated and designated generally as reference numeral 700. Example method 700 comprises compressing a logfile 236, such as a JSON log, using an index tree such as index tree 232. In particular, now that a full index tree has been constructed by method 600, based on the JSON log, method 700 goes back to the JSON log and replaces raw string(s), key(s), value(s), or multiple key-value pairs of the JSON log with the numbers (or other dictionary expressions) in the index tree from the dictionaries. The result of method 700 is an encoded row such as item 850 of FIG. 8, which may be compressed further using conventional compression methods. Again, although a JSON log is used for method 700, it is contemplated that other hierarchically organized or key-value pair data logs may be used, as described previously. In one embodiment, compression component 218, described in connection to FIG. 2, may facilitate carrying out method 700.

As with method 600 of FIG. 6, method 700 is recursive. In particular, row encoding is recursively applied for each row of a logfile and, in some embodiments, recursively for each node in a row, as illustrated in FIG. 7 by the arrow connecting step 740 back to step 710. In an embodiment, method 700 starts with a row of a logfile in a raw string structure, such as the example row 400 of FIG. 4. At a high level, method 700 checks the JSON object (the node) as a string to see if it can be stored as a raw string. If so, then the node is replaced by the raw string index entry. If the string cannot be represented as a raw string index, then it is stored as a tree node, and method 700 goes deeper into the node to evaluate the other levels of the index.

Accordingly, at a step 710, method 700 determines whether the JSON node can be represented as a raw string index entry. In an embodiment, a JSON node is more suitable for indexing as a raw string where the string repeats in the log and/or where there are a limited number of values (which may be determined by a threshold or efficiency factor) that can appear repeatedly for the raw string. For example, the raw string "City:Philadelphia, Market:en-US, Continent:North America" is likely to have only a limited number of US cities. (Each US city will have the same Market and Continent key-value pairs.) In contrast, the raw string "City:Philadelphia, Market:en-US, Continent:North America, ClientID: 4A70A8E585A" is not as likely to have a limited number of values in the log because there could be a higher number of different ClientID values. In an embodiment, a threshold may be used for determining whether the JSON node is suitable as a raw-string index entry.

At a step 715, if the JSON node can be represented as a raw string index, then at step 720 the node is replaced with the raw string index entry, and method 700 proceeds to the next node (step 710). For example, a dictionary expression corresponding to the raw string is used to replace the raw string in the encoded row. If the JSON node is not suitable for the raw string index, then method 700 proceeds to step 725. At step 725, method 700 checks whether the JSON node is suitable for a level 2 index. In an embodiment, a level 2 index entry can replace multiple correlated key-value pairs, as described in method 600. If at step 725 there is a level 2 index, then at step 730 correlated key-value pairs are replaced with the level 2 index entry (e.g., the dictionary expressions corresponding to the key-value pairs). Where there is not a level 2 index, indicating that the key-value pairs cannot be included in a level 2 index as determined in method 600, then at step 740 the remaining keys are each replaced by the level 1 index entry as indicated by the dictionary. Method 700 then proceeds to check the key's value (the child JSON value, which may include a child node) and returns to step 710, until all the rows for the JSON log have been encoded.

Method 700 is a recursive algorithm because of the data structure of the JSON log and corresponding index tree generated by method 600. Thus, checking a node's values for a level 1 index entry may be considered checking the raw string index of the children of those keys corresponding to the values. In other words, the raw string index may be considered a level 1 index of the higher (parent) level of the JSON node.

Turning to FIG. 8, a first example is illustratively provided showing methods 600 and 700 applied to an example JSON tree node 810. Node 810 includes a first set of key-value pairs 802, which includes the key-value pairs "City:Philadelphia," "Market:en-US," "Continent:North America," and a second key-value pair 806 that includes key 804 ("ClientID") and value 805 ("4A70A8E585A"). First we determine whether node 810 can be indexed as its raw string. Here, key-value pairs 802 are likely to be limited and repeating, since each row has a limited number of cities, markets, and continents. But ClientIDs are not likely to repeat. (For this example, we assume that the ClientIDs are different for each row.) Thus, because the ClientIDs do not repeat and are not substantially limited, such as item 802, the raw string value of the JSON object (the node) is not likely to repeat either. For example, a dictionary representing the raw string would be too large because every different ClientID in a node would necessitate a different dictionary expression. Therefore, node 810 is not suitable for storing as a raw string index, and the raw string index level is empty for node 810, as indicated by item 820.

Next, level 1 indexing is performed, and we store the JSON node keys in the level 1 index, which may be referred to as the JSON key index, as shown in item 830. Each key 832 is assigned an index entry 834 (i.e., a dictionary expression). In particular, item 835 shows a portion of the level 1 dictionary, which includes the keys from node 810 and corresponding index entries (dictionary expressions). During the level 1 indexing, in one embodiment, we first check the JSON keys and count how many times the keys repeat in the log. The most often appearing key is given a shorter index entry (e.g., dictionary expression, such as "0"). So for example, if each row has a "City" key but not all rows have a "Market" key, then a shorter index entry will be used for "City."

JSON keys are stored in the level 1 index as shown in items 830 and 835, and the key values are checked. In particular, a value is checked by another raw string index one level below the JSON node (a child of the JSON node). For example, for the value "Philadelphia" corresponding to the key "City," the value is only a string ("Philadelphia"), so we check only the raw string index. (But if the value were another key-value pair or multiple key-value pairs, then we would proceed to check the level 1 and/or level 2 indexes.) Because there are only so many cities (the number of cities is limited), the value can be marked as indexable and stored in the raw index of the next level. In other words, the value "Philadelphia" is stored in the raw string index of the children of the "City" key.

Continuing with this example, we put all of the JSON node keys and the values of "City," "Market," and "Continent" into the index tree node corresponding to this JSON object. We then proceed to level 2, as shown in item 840, and build the level 2 index based on the level 1 index. Here, we check how many combinations are there of the values of "City," "Market," and "Continent." Since the JSON values of these three keys can be determined to be correlated (for example, every time the value "Philadelphia" occurs, the values for "Market" and "Continent" will always be "en-US" and "North America," respectively), we can predict that they will pass the level 2 index check and be added to the level 2 index of the node, as shown in items 842, 844, and 846. Accordingly, the resulting global index tree node corresponding to the JSON object (node 810) comprises items 820, 830, and 840, which are partially shown in items 835 for level 1 index, and items 842, 844, and 846 for the level 2 index.

We now replace the raw strings (for example, in node 810, there are none), keys, and key-value pairs with the level 1 and level 2 index entries, respectively. The resulting encoded row (encoded node 810) is shown as item 850. For this example, the encoded or indexed row 850 comprises 4 sub items: 852, 853, 855, and value 805. Sub-items 852 and 853 correspond to key-value pairs 802 in node 810. Sub-item 855 corresponds to key 804 ("ClientID"), and value 805 in row 850 is the same as value 805 in node 810. It is clear that resulting encoded row 850 is significantly shorter than the original node 810.

The sub-items of encoded row 850 are now explained. Sub-item 852 (the letter "i") is an identifier for a level 2 index. Because both a level 1 index and a level 2 index can have the same index entry, such as "1," an identifier is needed to distinguish between level 1 and level 2. For example, item 835 includes a level 1 index entry for "1" corresponding to the "Market" key, and item 844 includes a level 2 index entry for "1" corresponding to the "City:Philadelphia, Market:en-US, Continent:North America" key-value pairs. Therefore, without an identifier, such as item 852, we would be unable to determine whether a "1" in the encoded row 850 should represent "Market" or "City:Philadelphia, Market:en-US, Continent:North America." But because the identifier 852 is present, we know to go to the level 2 index.

We further assign a special key for the level 2 index. Specifically, where the "i" is before the colon (as it is in row 850), then we identify the number after the colon in a level 2 key index. But where the "i" is after the colon, then we look for the number before the colon in a level 2 value index. So for this example, the identifier "i" (item 852) is followed by a "1" (item 853) after the colon. Thus, the "i" indicates we go to the level 2 index. In the level 2 index, we see at item 844 that the index entry "1" (the number after the colon) corresponds to "City:Philadelphia, Market:en-US, Continent:North America." Therefore, the original set of key-value pairs 802 of node 810 is represented as "i:1" in encoded row 850.

Item 855 is the number "3" which is not a level 2 indicator "i." Therefore, we look to the level 1 index. Since the "3" comes before the colon, we look to the level 1 key index and see (at item 835) that "3" corresponds to the "ClientID" key. Therefore, key 804 ("ClientID") of node 810 is represented as the "3" (item 855) in encoded row 850. Finally, value 805, which is a value for a ClientID, was not indexed. Thus, value 805 of encoded row 850 is the same as value 805 of node 810.

With reference to FIG. 9, a second example is illustratively provided showing methods 600 and 700 applied to an example JSON node 910. This example is intended to show how a raw string index works. JSON node 910 includes two keys: "ReverseIpInfo" 902 and "ClientID" 906. Each of keys 902 and 906 has a corresponding value 904 and 908, respectively. For the purposes of this example, it is assumed that value 904 is repeating in the log (therefore, the number of key-value pairs having value 904 is limited) and, therefore, is suitable for raw indexing. One embodiment of method 600 may examine the entire row or log to determine whether it includes a plurality of occurrences of a key, value, or node in order to determine suitability for raw string indexing. Accordingly, the value 904 is included in the raw string index. In particular, for the raw string dictionary (not shown), value 904 is assigned an index entry "0."

The keys of node 910 are stored in the level 1 index. Specifically, for a level 1 dictionary (not shown), "ReverseIpInfo" key 902 has a "0" for its index entry and "ClientID" key 906 has a "1" for its index entry. Key-value pairs of node 910 are checked for correlation. Here, the value 904 "City:Philadelphia, Market:en-US, Continent:North America" corresponding to the "ReverseIpInfo" key 902 is already indexed in the raw string index. The key-value pair representing key 906 and value 908 is not correlated because the number of key-value pairs for ClientID is too great. (There are too many ClientID values such as value 908, representing all of the different clientIDs.) Therefore, level 2 indexing is not performed. Furthermore, because the value 908 does not repeat, it is not included in a level 1 value index. Thus, value 908 is excluded from the index.

The resulting encoded row (encoded node 910) is shown as encoded row 920. Encoded row 920 includes sub-item 922, which is a "0" and refers to the level 1 index. Because there is no indicator "i" as described above in connection to FIG. 8, the "0" refers to the level 1 index. In particular, the level 1 index entry "0" (from the level 1 dictionary) corresponds to "ReverseIpInfo." Encoded row 920 also includes sub-item 924, which is also a "0" and refers to a value (because it is after the colon) which is in the raw string index. The raw string dictionary entry "0" corresponds to value 904 ("City: Philadelphia, Market:en-US, Continent:North America").

Encoded row 920 also includes sub-item 926, which is a "1" and refers to a key in the level 1 index, because there is no level 2 index indicator and because the "1" is before the colon. The level 1 dictionary key entry "1" corresponds to "ClientID" key 906. Finally, encoded row 920 includes sub-item 928, which is value 908 (a ClientID value). Value 908 was not included in the index and therefore appears (as sub-item 928) in encoded row 920.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and graphical user interfaces. It will be understood that certain features and sub-combinations are of utility and may be employed without reference to other features and sub-combinations. This is contemplated by and within the scope of the claims.

The invention claimed is:

1. One or more computer-readable storage media having instructions embodied thereon that, when executed, perform a method for building an index tree for compressing a logfile, the method comprising:
   receiving a logfile comprising one or more nodes, each node having one or more keys, values, and key-value pairs;
   for a first node, determining whether to index a raw string representation of the node;
   upon determining to index the raw string, storing the raw string representation of the node in a raw-string level index;
   upon determining not to index the raw string:
   (1) for each key in the node, storing the key in a first level index;
   (2) for each key-value pair in the node, determining that the key-value pair is correlated; and
   (3) upon determining that the key-value pair is correlated, storing the key-value pair in a second level index; and
   creating an index tree corresponding to the logfile from the raw string, first, and second level indexes of the first node.

2. The media of claim 1, wherein upon determining not to index the raw string further comprises:
   determining common values of the node by identifying one or more values of the node that repeat in the logfile; and
   storing the common values in the first level index.

3. The media of claim 1, wherein determining whether to index a raw string representation of the node includes using a threshold that is set based on a maximum size of the raw-string level index.

4. The media of claim 1, wherein determining whether the key-value pair is correlated comprises determining a plurality of occurrences of the key-value pair in the logfile.

5. The media of claim 1, wherein determining whether the key-value pair is correlated comprises determining, in the logfile, that the number of different values that are paired with the key of the key-value pair satisfies a threshold.

6. The media of claim 1 further comprising compressing the first node of the logfile with the index tree.

7. The media of claim 6, wherein compressing the first node of the logfile comprises:
   determining whether the first node is indexed as the raw string;
   upon determining that the first node is indexed as the raw string, replacing the node with a raw-string index entry, in the raw-string level index, that corresponds to the raw string of the node; and upon determining that the first node is not indexed as the raw string:
(1) for each key-value pair of the first node, determining whether a candidate key-value pair is indexed in the second level index;
(2) upon determining that the candidate key-value pair is indexed in the second level index, replacing the candidate key-value pair with a second-level index entry, in the second level index, that corresponds to the candidate key-value pair; and
(3) upon determining that the candidate key-value pair is not indexed in the second level index, replacing the candidate key of the candidate key-value pair with a first-level key index entry, in the first level index, that corresponds to the candidate key.

8. The media of claim 7, wherein upon determining that the candidate key-value pair is not indexed in the second level index further comprises:
determining that the candidate value of the candidate key-value pair is indexed in the first level index; and
replacing the candidate value with a first-level value index entry, in the first level index, that corresponds to the candidate value.

9. The media of claim 1, wherein the logfile comprises a JSON log.

10. The media of claim 1, wherein the logfile includes data representing search-engine user interaction information from a plurality of users.

11. The media of claim 1, wherein the method is recursively applied for each node of the one or more nodes of the logfile, and wherein the index tree is further created from the raw string, first, and second level indexes of each node.

12. One or more computer-readable storage media having instructions embodied thereon that, when executed, perform a method for compressing a logfile, the method comprising:
receiving a logfile including one or more logfile nodes, each logfile node having one or more keys, values, and key-value pairs;
receiving an index tree corresponding to the logfile, the index tree including one or more index tree-nodes corresponding to the one or more logfile nodes, and further comprising a raw-string level index, a first level index, and a second level index corresponding to each index tree-node;
for a first logfile node corresponding to a first index tree-node, determining whether the first logfile node is indexed as a raw string;
upon determining that the first logfile node is indexed as a raw string, replacing the logfile node with a raw-string index entry, in the raw-string level index, that corresponds to a raw string representation of the logfile node;
upon determining that the first logfile node is not indexed as the raw string:
(1) for each key-value pair of the first logfile node, determining whether the key-value pair is indexed in the second level index;
(2) upon determining that the key-value pair is indexed in the second level index, replacing the key-value pair with a second-level index entry, in the second level index, that corresponds to the key-value pair; and
(3) upon determining that the key-value pair is not indexed in the second level index, replacing the key of the key-value pair with a first-level key index entry, in the first level index, that corresponds to the key.

13. The media of claim 12, wherein upon determining that the key-value pair is not indexed in the second level index further comprises:

determining that the value of the key-value pair is indexed in the first level index; and
replacing the value with a first-level value index entry, in the first level index, that corresponds to the value.

14. The media of claim 13, wherein the method is recursively applied for each node of the one or more logfile nodes.

15. The media of claim 12, wherein the logfile comprises a JSON log.

16. The media of claim 11, wherein the logfile includes data representing search-engine user interaction information from a plurality of users.

17. One or more computer-readable storage media having instructions embodied thereon that, when executed, perform a method for compressing a logfile using a tree-structured index corresponding to the logfile, the method comprising:
receiving a logfile comprising one or more nodes, each node having a one or more keys, values, and key-value pairs;
for each node, recursively:
(1) determining whether to index a raw string representation of the node;
(2) upon determining to index the raw string, storing the raw string representation of the node in a raw-string level dictionary;
(3) upon determining not to index the raw string:
a) for each key in the node, storing the key in a first-level key dictionary;
b) determining common values of the node by identifying one or more values of the node that repeat in the logfile;
c) storing the common values in the first-level value dictionary;
d) for each key-value pair in the node, determining that the key-value pair is correlated; and
e) upon determining that the key-value pair is correlated, storing the key-value pair in a second-level dictionary;
creating an index tree corresponding to the logfile, from the raw-string level, first-level value, first-level key, and second-level dictionaries of each node; and
for each node of the logfile, compressing the node with the index tree.

18. The media of claim 17, wherein compressing the node with the index tree comprises:
determining whether the node is indexed as the raw string;
upon determining that the node is indexed as the raw string, replacing the node with a raw-string index entry, in the raw-string level dictionary, that corresponds to the raw string of the node;
upon determining that the node is not indexed as the raw string:
(1) for each key-value pair of the node, determining whether a candidate key-value pair is indexed in the second-level dictionary;
(2) upon determining that the candidate key-value pair is indexed in the second-level dictionary, replacing the candidate key-value pair with the second-level dictionary entry that corresponds to the candidate key-value pair; and
(3) upon determining that the candidate key-value pair is not indexed in the second-level dictionary:
a) replacing the candidate key of the candidate key-value pair with a first-level key dictionary entry that corresponds to the candidate key;
b) determining that the candidate value of the candidate key-value pair is indexed in the first-level value dictionary; and c) replacing the candidate value with a first-level value dictionary entry that corresponds to the candidate value.

19. The media of claim 17, wherein the logfile comprises a JSON log.

20. The media of claim 17, wherein the logfile includes data representing search-engine user interaction information from a plurality of users.

* * * * *